United States Patent
Tang et al.

(10) Patent No.: US 9,496,705 B2
(45) Date of Patent: Nov. 15, 2016

(54) PROTECTION CIRCUIT OF COMMUNICATION INTERFACE

(71) Applicant: ZTE Corporation, Shenzhen (CN)

(72) Inventors: Guohua Tang, Shenzhen (CN); Shihao Qin, Shenzhen (CN); Jianye Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 158 days.

(21) Appl. No.: 14/410,640

(22) PCT Filed: Jun. 27, 2013

(86) PCT No.: PCT/CN2013/078104
§ 371 (c)(1),
(2) Date: Dec. 23, 2014

(87) PCT Pub. No.: WO2013/189314
PCT Pub. Date: Dec. 27, 2013

(65) Prior Publication Data
US 2015/0326006 A1    Nov. 12, 2015

(30) Foreign Application Priority Data
Jun. 28, 2012 (CN) .......................... 2012 1 0217805

(51) Int. Cl.
*H02H 3/22* (2006.01)
*H02H 9/02* (2006.01)
*H04L 12/10* (2006.01)

(52) U.S. Cl.
CPC .................. *H02H 3/22* (2013.01); *H02H 9/02* (2013.01); *H04L 12/10* (2013.01)

(58) Field of Classification Search
CPC ........... H02H 3/22; H02H 9/02; H04L 12/10
USPC ........................................................ 361/91.1
See application file for complete search history.

(56) References Cited

U.S. PATENT DOCUMENTS 5,677,820 A * 10/1997 Pelegris .................. H04M 3/18
361/119
6,266,223 B1 * 7/2001 Curry ..................... H02H 9/042
361/119

(Continued)

FOREIGN PATENT DOCUMENTS

CN    1472859 A    2/2004
CN    1549416 A    11/2004

(Continued)

OTHER PUBLICATIONS

ISO-4850P Industrial RS-485 Surge Protector 2-Wire [See Diagrams and Description].*

(Continued)

*Primary Examiner* — Dharti Patel
(74) *Attorney, Agent, or Firm* — Banner & Witcoff, Ltd.

(57) ABSTRACT

A protection circuit of a communication interface includes: a first-level protection circuit, a second-level protection circuit and a third-level protection circuit that are sequentially connected, wherein the first-level protection circuit comprises a current discharge circuit comprising a first connection end, a second connection end and a third connection end, wherein the first connection end is connected with a first signal line of an RS-485 port, the second connection end is connected with a second signal line of the RS-485 port, and the third connection end is connected to the protection ground; the second-level protection circuit comprises a first current limiting resistor, a second current limiting resistor and a bidirectional transient suppression diode; and the third-level protection circuit comprises a voltage discharge circuit.

11 Claims, 1 Drawing Sheet

(56) References Cited

U.S. PATENT DOCUMENTS

| | | | |
|---|---|---|---|
| 9,099,875 B2* | 8/2015 | Pan | H02J 7/0034 |
| 9,391,445 B2* | 7/2016 | Sun | H02H 7/12 |
| 2012/0326006 A1* | 12/2012 | Iwatsuki | G01V 8/12 |
| | | | 250/206 |

FOREIGN PATENT DOCUMENTS

| | | |
|---|---|---|
| CN | 201178306 Y | 1/2009 |
| CN | 201417941 Y | 3/2010 |
| CN | 201466714 U | 5/2010 |
| CN | 102110067 A | 6/2011 |
| WO | 0161954 A1 | 8/2001 |
| WO | 2005064760 A1 | 7/2005 |

OTHER PUBLICATIONS

Search Report of EP Application No. 13806826.7, dated Mar. 4, 2016.
ISO-485 Industrial RS-485 Surge Protector 2-Wire (retrieved from www.web.archive.org/web/20120409144342/http://ww.rs232-converters.com/converter_specs/ISO-485-P.pdf, dated Sep. 4, 2012, 2 pages.
RS-422 and RS-485 Application Note (retrieved from www.cpii.com/docs/library/4/485appnote.pdf) B & B Electronics Manufacturing Company, Jun. 2006, 2 pages.
International Search Report of PCT/CN2013/078104 dated Aug. 22, 2013.

* cited by examiner

PROTECTION CIRCUIT OF COMMUNICATION INTERFACE

TECHNICAL FIELD

The present document relates to the field of electronic circuits, and in particular, to a protection circuit of a communication interface.

BACKGROUND OF THE RELATED ART

The RS-485, as a traditional industrial communication bus, uses balanced transmission and differential reception, and has advantages such as a strong capability of common mode interference suppression, a long transmission distance, availability in multi-point interconnection, and low cost etc., and therefore is widely used in various industrial control fields. Due to a poor industrial field environment, the RS-485 port is generally required to have a protection circuitry to protect the device against influences of lightning, surge and static electricity.

In the protection circuit of the RS-485 port, according to the actual application scenarios, a current limiting device and a Transient Voltage Suppressor (TVS) are mostly used to simply perform a process of protection against surge and static, which has a low protection level. In some cases, two lines of a first level at an entrance of the RS-485 port are connected to the protection ground via a gas discharge tube respectively, and a Positive Temperature Coefficient (PTC) resistor is connected in series respectively on the two lines; and two lines of a second level are connected to the protection ground respectively via a bidirectional or uni-directional TVS, and then there is a bidirectional TVS between lines, which is a strong protection structure.

In practical applications, due to differences in the ground connection environment for the protection ground in the field, it results in a voltage difference between the protection ground and the actual ground. Such circuit of a strong protection structure is not necessarily capable of suppressing lightning and surge effectively, and the breakdown voltage from the signal lines of the second level to the TVS is very low, and is generally only a few volts. Therefore, it is prone for the voltage of the protection ground to rise and break down, and thus a condition that the RS-485 communication port is damaged occurs.

SUMMARY

The embodiments of the present invention provide a protection circuit of a communication interface, to achieve purposes of implementing comprehensive protection against lightning, surge and static electricity on an RS-485 port of a device without affecting the transmission performance of a communication interface.

The embodiments of the present invention provide a protection circuit of a communication interface, comprising: a first-level protection circuit, a second-level protection circuit and a third-level protection circuit that are sequentially connected, wherein, the first-level protection circuit comprises a current discharge circuit comprising a first connection end, a second connection end and a third connection end, wherein the first connection end is connected with a first signal line of an RS-485 port, the second connection end is connected with a second signal line of the RS-485 port, and the third connection end is connected to the protection ground and introduces the generated current to the ground when the RS-485 port is intruded by a voltage;

the second-level protection circuit comprises a first current limiting resistor, a second current limiting resistor and a bidirectional transient voltage suppressor, wherein, the first current limiting resistor is connected with the first signal line, the second current limiting resistor is connected with the second signal line, and the two ends of the bidirectional transient voltage suppressor are connected respectively with the first signal line which is connected with the first current limiting resistor and the second signal line which is connected with the second current limiting resistor; and the third-level protection circuit comprises a voltage discharge circuit, wherein the voltage discharge circuit is connected to the communication ground, and one end of the voltage discharge circuit is connected with the two signal lines of the RS-485 port, and the other end of the voltage discharge circuit is connected with a RS-485 transceiver, and the voltage discharge circuit is connected to the communication ground, and provides a voltage discharge path for the voltage between the second-level protection circuit and the RS-485 transceiver.

Alternatively, the protection circuit of a communication interface is further characterized in that, the current discharge circuit comprises any of the following:

a tri-pole gas discharge tube from the first and second signal lines of the RS-485 port to the protection ground; and a bi-pole gas discharge tube from the first and second signal lines of the RS-485 port to the protection ground.

Alternatively, the protection circuit of a communication interface is further characterized in that, each of the tri-pole gas discharge tube and the bi-pole gas discharge tube has a range of a breakdown voltage from 30V to 150V.

Alternatively, the protection circuit of a communication interface is further characterized in that, each of the tri-pole gas discharge tube and the bi-pole gas discharge tube has a breakdown voltage of 90V.

Alternatively, the protection circuit of a communication interface is further characterized in that, the voltage discharge circuit comprises any of the following:

a first bi-end bidirectional transient voltage suppressor and a second bi-end bidirectional transient voltage suppressor, wherein one end of the first bi-end bidirectional transient voltage suppressor is connected with the first signal line, and the other end of the first bi-end bidirectional transient voltage suppressor is connected to the communication ground; and one end of the second bi-end bidirectional transient voltage suppressor is connected with the second signal line, and the other end of the bi-end bidirectional transient voltage suppressor is connected to the communication ground; and a tri-end double uni-directional transient voltage suppressor and a bi-end uni-directional transient voltage suppressor, wherein, a first one of two non-common ends of the tri-end double uni-directional transient voltage suppressor is connected with the first signal line, and a second one of the two non-common ends of the tri-end double uni-directional transient voltage suppressor is connected with the second signal line; and one end of the bi-end uni-directional transient voltage suppressor is connected to a common end of the tri-end double uni-directional transient voltage suppressor, and the other end of the bi-end uni-directional transient voltage suppressor is connected to the communication ground.

Alternatively, the protection circuit of a communication interface is further characterized in that, each of the bi-end bidirectional transient voltage suppressor, the tri-end double uni-directional transient voltage suppressor, and the bi-end uni-directional transient voltage suppressor has a range of a breakdown voltage from 5V to 7V.

Alternatively, the protection circuit of a communication interface is further characterized in that, each of the bi-end bidirectional transient voltage suppressor, the tri-end double uni-directional transient voltage suppressor, and the bi-end uni-directional transient voltage suppressor has a breakdown voltage of 6.45V.

Alternatively, the protection circuit of a communication interface is further characterized in that, the first current limiting resistor and the second current limiting resistor are ohm-level power current limiting resistors.

Alternatively, the protection circuit of a communication interface is further characterized in that, each of the first current limiting resistor and the second current limiting resistor has a magnitude range from 10 to 30 Ohms.

Alternatively, the protection circuit of a communication interface is further characterized in that, each of the first current limiting resistor and the second current limiting resistor has a magnitude of 20 Ohms.

Alternatively, the protection circuit of a communication interface is further characterized in that, the protection ground is electrically isolated from the communication ground.

In the embodiments of the present invention, a large amount of the energy entering the RS-485 port is leaked through the first-level protection circuit; then the remaining residual voltage is processed by the second-level protection circuit to suppress the interference current and absorb the differential-mode voltage. The two level processes may remove most of interferences, thereby completing primary protection functions. Then, the remaining residual voltage and static interference after the above two processes are processed by a third-level protection circuit, so that the transmission on the signal lines recovers to a transmission function in a normal state (i.e., a case that it is not intruded by a high surge voltage), and then signals are transmitted to the transceiver to achieve purposes of implementing comprehensive protection against lightning, surge and static on an RS-485 port of a device without affecting the transmission performance of a communication interface.

PREFERRED EMBODIMENTS OF THE PRESENT INVENTION

Figure 1:
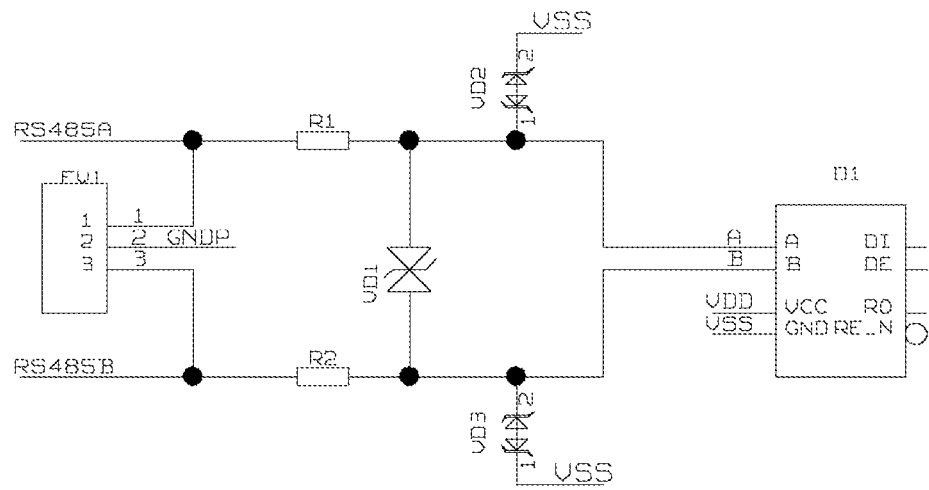
FIG. 1 is a structural diagram of a protection circuit of a communication interface according to an application example 1 of the present document.

The technical solutions of the present document will be further described in detail below in conjunction with accompanying drawings and specific embodiments. It should be illustrated that without conflict, the embodiments in the present application and the features in the embodiments could be combined with each other randomly.

A structural diagram of a protection circuit of a communication interface is provided in the embodiments of the present invention. The protection circuit includes a first-level protection circuit, a second-level protection circuit and a third-level protection circuit that are sequentially connected, wherein, the first-level protection circuit comprises a current discharge circuit comprising a first connection end, a second connection end and a third connection end, wherein the first connection end is connected with a first signal line of an RS-485 port, the second connection end is connected with a second signal line of the RS-485 port, and the third connection end is connected to the protection ground and introduces the generated current to the ground when the RS-485 port is intruded by a voltage;

the second-level protection circuit comprises a first current limiting resistor, a second current limiting resistor and a bidirectional transient voltage suppressor, wherein, the first current limiting resistor is connected with the first signal line, the second current limiting resistor is connected with the second signal line, and the two ends of the bidirectional transient voltage suppressor are connected respectively with the first signal line which is connected with the first current limiting resistor and the second signal line which is connected with the second current limiting resistor; and the third-level protection circuit comprises a voltage discharge circuit, wherein the voltage discharge circuit is connected to the communication ground, and one end of the voltage discharge circuit is connected with the two signal lines of the RS-485 port, and the other end of the voltage discharge circuit is connected with a RS-485 transceiver, and the voltage discharge circuit is connected to the communication ground, and provides a voltage discharge path for the voltage between the second-level protection circuit and the RS-485 transceiver.

For the above circuit, when the entrance of the RS-485 is induced by lightning or intruded by high surge voltage generated by other interference sources, a first-level protection circuit provides a high current discharge path to the Protection Ground (GNDP), and a large amount of energy of lightning and surge is leaked from here to the protection ground. For a residual voltage formed after the first-level protection circuit does not discharge or discharges, a differential-mode portion of the voltage will be absorbed by the second-level protection circuit. After the process of the second-level protection circuit, interference will occur due to static, a residual voltage from the previous level and induction, which influences the operation of the RS-485 transceiver, and therefore, it needs to implement common-mode protection by a third-level protection circuit through a voltage discharge circuit to eliminate the above interference, thereby ensuring the transmission performance of the RS-485.

It can be seen that a large amount of the energy entering the RS-485 port is leaked through the first-level protection circuit; then the remaining residual voltage is processed by the second-level protection circuit to suppress the interference current and absorb the differential-mode voltage. The two level processes may remove most of interferences, thereby completing primary protection functions. Then, the remaining residual voltage and static interference after the above two processes are processed by a third-level protection circuit, so that the transmission on the signal lines recovers to a transmission function in a normal state (i.e., a case that it is not intruded by a high surge voltage), and then signals are transmitted to the transceiver to achieve purposes of implementing comprehensive protection against lightning, surge and static on an RS-485 port of a device without affecting the transmission performance of a communication interface.

It should be illustrated that a current limiting resistor in the above circuit is not a thermistor usually used in the related art. The purpose of using the current limiting resistor in the above circuit is to limit the surge current on the signal lines, thereby achieving short-cut protection and residual voltage suppression of the RS-485 port. However, the thermistor in the related art responds slowly, and cannot achieve the above effect.

In addition, the voltage discharge circuit in the third-level protection circuit used in the above circuit is connected to the communication ground, which is different from the connection to the protection ground in the related art, and a specific reason thereof will be described below.

If the voltage discharge circuit in the third-level protection circuit and the current discharge circuit in the first-level protection circuit are similarly connected to the protection ground, when the lightning current is leaked, it will result in a rise in the voltage of the protection ground. Once the voltage of the protection ground rises, the TVS of the third-level protection circuit similarly connected to the protection ground will be break down, thereby burning out the RS-485 transceiver. When the voltage discharge circuit in the third-level protection circuit is connected to the communication ground, as the communication ground is electrically isolated from the protection ground, there is no problem that the protection ground has a negative voltage, thereby ensuring that there is a safe operating environment for the RS-485 transceiver.

Wherein, the current discharge circuit comprises any of the following:

manner one: a tri-pole gas discharge tube from the first and second signal lines of the RS-485 port to the protection ground; and manner two: a bi-pole gas discharge tube from the first and second signal lines of the RS-485 port to the protection ground.

Wherein, each of the tri-pole gas discharge tube and the bi-pole gas discharge tube is a high power gas discharge tube, and has a large breakdown voltage, which is in a range of 30V to 150V. In the present embodiment, a gas discharge tube with a breakdown voltage of 90V is used.

Wherein, the voltage discharge circuit comprises any of the following:

manner one: a first bi-end bidirectional transient voltage suppressor and a second bi-end bidirectional transient voltage suppressor, wherein one end of the first bi-end bidirectional transient voltage suppressor is connected with the first signal line, and the other end of the first bi-end bidirectional transient voltage suppressor is connected to the communication ground; and one end of the second bi-end bidirectional transient voltage suppressor is connected with the second signal line, and the other end of the bi-end bidirectional transient voltage suppressor is connected to the communication ground; and manner two: a tri-end double uni-directional transient voltage suppressor and a bi-end uni-directional transient voltage suppressor, wherein, a first one of two non-common ends of the tri-end double uni-directional transient voltage suppressor is connected with the first signal line, and a second one of the two non-common ends of the tri-end double uni-directional transient voltage suppressor is connected with the second signal line; and one end of the bi-end uni-directional transient voltage suppressor is connected to a common end of the tri-end double uni-directional transient voltage suppressor, and the other end of the bi-end uni-directional transient voltage suppressor is connected to the communication ground.

Each of the bi-end bidirectional transient voltage suppressor, the tri-end double uni-directional transient voltage suppressor, and the bi-end uni-directional transient voltage suppressor has a range of a breakdown voltage from 5V to 7V. Alternatively, each of the bi-end bidirectional transient voltage suppressor, the tri-end double uni-directional transient voltage suppressor, and the bi-end uni-directional transient voltage suppressor has a breakdown voltage of 6.45V.

Wherein, each of the first current limiting resistor and the second current limiting resistor is an ohm-level power current limiting resistor, and has a magnitude range from 10 to 30 Ohms. In the present embodiment, each of the first current limiting resistor and the second current limiting resistor has a magnitude of 20 Ohms.

The circuit according to an embodiment of the present invention will be further described below in conjunction with accompanying drawings.

Application Embodiment One

FIG. 1 is a structural diagram of a protection circuit of a communication interface according to an application example 1 of the present document. In the application example of the circuit illustrated in FIG. 1, the circuit includes a three-pole gas discharge tube FV1, a current limiting resistor R1, a current limiting resistor R2, a bi-directional transient voltage suppressor VD1, a bi-directional transient voltage suppressor VD2, a bi-directional transient voltage suppressor VD3, and a RS-485 transceiver D1.

Entrances of RS485A and RS485B signal lines of the RS-485 port are connected to the protection ground GNDP through the tri-port gas discharge tube FV1, to constitute a first-level protection circuit. The RS485A signal line is connected with the current limiting resistor R1 in series. The RS485B signal line is also connected with the current limiting resistor R2 in series. After the current limiting resistors, the two signal lines are connected respectively to two ends of the bi-directional transient voltage suppressor VD1, to constitute a second-level protection circuit. The second-level protection circuit is then connected to a third-level protection circuit in series. The third-level protection circuit includes bi-directional transient voltage suppressors VD2 and VD3 from two signal lines A, B respectively to the Voltage Series (VSS) between the second-level protection circuit and the RS-485 transceiver D1, and the VD2 and the VD3 are close to a end with pins A and B of the RS-485 transceiver D1.

The operating principle of the circuit according to the present embodiment is as follows: when the RS485 entrance (RS485A and RS485B) is induced by lightning or intruded by high surge voltage generated by other interference sources, the tri-pole gas discharge tube FV1 provides a high-current discharge path to the protection ground GNDP, and a large amount of energy of the lightning and surge is leaked from here to the ground. At this same time, residual voltages formed after the discharge tube does not discharge or discharges are absorbed by following R1, R2 and VD1. The R1 and R2 play a current limiting role, and can perform short-cut protection and interference suppression of the RS-485 port. The circuit comprised of the bi-directional transient voltage suppressors VD2 and VD3 plays a role in common-mode protection of static, a residual voltage from the previous level and induced interference.

Application Embodiment Two

Figure 2:
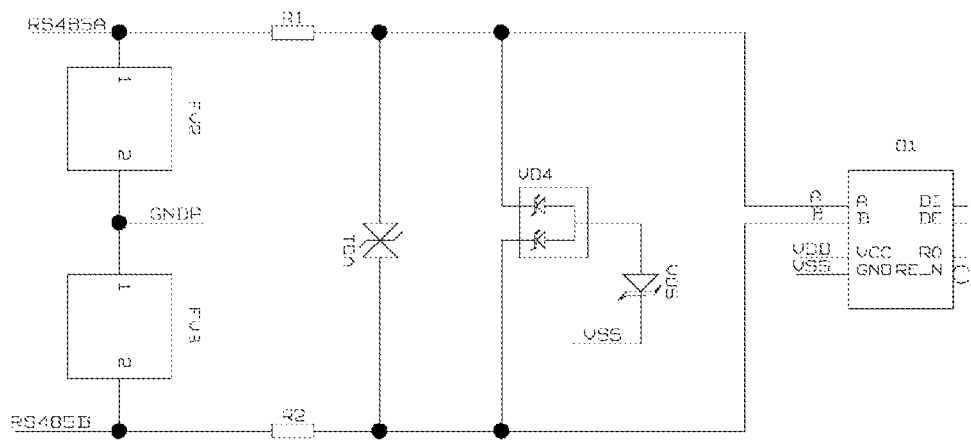
FIG. 2 is a structural diagram of a protection circuit of a communication interface according to an application example 2 of the present document.

FIG. 2 is a structural diagram of a protection circuit of a communication interface according to an application example 2 of the present document. The operating principle of the application example of the circuit illustrated 2 is the same as that in embodiment one, except for a slight change to the structure. There are two primary differences. First of all, at the RS-485 port, the current limiting resistors R1 and R2 are close to the RS485A and RS485B of the output of the RS-485 port, and the RS485A and RS485B are connected to the protection ground GNDP respectively through the bi-pole discharge tubes FV2 and FV3. In addition, the third-level bidirectional transient-suppression voltage discharge circuit in the present embodiment uses a tri-end double uni-directional transient voltage suppressor VD4 and a bi-end uni-directional transient voltage suppressor VD5. One end of the bi-end uni-directional transient voltage suppressor VD5 is connected to a common end of the tri-end double uni-directional transient voltage suppressor VD4, and the other end of the bi-end uni-directional transient voltage suppressor VD5 is connected to the communication ground VSS, to constitute bidirectional transient voltage discharge circuits from two signal lines A and B to the communication ground VSS.

In the protection circuits in the above two application examples, the surge current may be 5 KA, the surge protection level line is at ±4 KV, and the ground line is at ±6 KV. In those systems in which the protection ground GNDP is not well grounded, the RS-485 can also be ensured to operate normally.

The above description is only the specific embodiments of the present invention, and the protection scope of the present document is not limited to the above description. Any skilled in the art can easily think of changes or substitutions within the technique scope disclosed in the present document, which should be covered within the protection scope of the present document. Therefore, the protection scope of the present document should be based on the protection scope described in the claims.

INDUSTRIAL APPLICABILITY

The embodiments of the present invention achieve purposes of implementing comprehensive protection against lightning, surge and static electricity on an RS-485 port of a device without affecting the transmission performance of a communication interface.

What is claimed is:

1. A protection circuit of a communication interface, comprising: a first-level protection circuit, a second-level protection circuit and a third-level protection circuit that are sequentially connected, wherein,
    the first-level protection circuit comprises a current discharge circuit, the current discharge circuit comprising a first connection end, a second connection end and a third connection end, wherein the first connection end is connected with a first signal line of an RS-485 port, the second connection end is connected with a second signal line of the RS-485 port, and the third connection end is connected to a protection ground, and the third connection end introduces generated current to the ground when the RS-485 port is intruded by a voltage;
    the second-level protection circuit comprises a first current limiting resistor, a second current limiting resistor and a bidirectional transient voltage suppressor, wherein, the first current limiting resistor is connected with the first signal line, the second current limiting resistor is connected with the second signal line, and the two ends of the bidirectional transient voltage suppressor are connected respectively with the first signal line which is connected with the first current limiting resistor and the second signal line which is connected with the second current limiting resistor; and
    the third-level protection circuit comprises a voltage discharge circuit, wherein the voltage discharge circuit is connected to a communication ground, and one end of the voltage discharge circuit is connected with the two signal lines of the RS-485 port, and the other end of the voltage discharge circuit is connected with a RS-485 transceiver, the voltage discharge circuit is connected to the communication ground, and provides a voltage discharge path for the voltage between the second-level protection circuit and the RS-485 transceiver.

2. The protection circuit of a communication interface according to claim 1, wherein, the current discharge circuit comprises any of the following:
    a tri-pole gas discharge tube from the first and second signal lines of the RS-485 port to the protection ground; and
    a bi-pole gas discharge tube from the first and second signal lines of the RS-485 port to the protection ground.

3. The protection circuit of a communication interface according to claim 2, wherein, the ranges of the breakdown voltages of the tri-pole gas discharge tube and the bi-pole gas discharge tube are both 30V to 150V.

4. The protection circuit of a communication interface according to claim 3, wherein, the breakdown voltages of the tri-pole gas discharge tube and the bi-pole gas discharge tube are both 90V.

5. The protection circuit of a communication interface according to claim 1, wherein, the voltage discharge circuit comprises any of the following:
    a first bi-end bidirectional transient voltage suppressor and a second bi-end bidirectional transient voltage suppressor, wherein one end of the first bi-end bidirectional transient voltage suppressor is connected with the first signal line, and the other end of the first bi-end bidirectional transient voltage suppressor is connected to the communication ground; and one end of the second bi-end bidirectional transient voltage suppressor is connected with the second signal line, and the other end of the bi-end bidirectional transient voltage suppressor is connected to the communication ground; and
    a tri-end double uni-directional transient voltage suppressor and a bi-end uni-directional transient voltage suppressor, wherein, a first non-common end out of two non-common ends of the tri-end double uni-directional transient voltage suppressor is connected with the first signal line, and a second non-common end out of the two non-common ends of the tri-end double uni-directional transient voltage suppressor is connected with the second signal line; and one end of the bi-end uni-directional transient voltage suppressor is connected to a common end of the tri-end double uni-directional transient voltage suppressor, and the other end of the bi-end uni-directional transient voltage suppressor is connected to the communication ground.

6. The protection circuit of a communication interface according to claim 5, wherein, the ranges of the breakdown voltages of the bi-end bidirectional transient voltage suppressor, the tri-end double uni-directional transient voltage suppressor, and the bi-end uni-directional transient voltage suppressor are all 5V to 7V.

7. The protection circuit of a communication interface according to claim 6, wherein, the breakdown voltages of the bi-end bidirectional transient voltage suppressor, the tri-end double uni-directional transient voltage suppressor, and the bi-end uni-directional transient voltage suppressor are all 6.45V.

8. The protection circuit of a communication interface according to claim 1, wherein, the first current limiting resistor and the second current limiting resistor are ohm-level power current limiting resistors.

9. The protection circuit of a communication interface according to claim 8, wherein, the magnitude ranges of the first current limiting resistor and the second current limiting resistor are both 10 to 30 Ohms.

10. The protection circuit of a communication interface according to claim 9, wherein, the magnitudes of the first current limiting resistor and the second current limiting resistor are both 20 Ohms.

11. The protection circuit of a communication interface according to claim 1, wherein, the protection ground is electrically isolated from the communication ground.

* * * * *